United States Patent
Yoshikawa et al.

(10) Patent No.: US 11,104,840 B2
(45) Date of Patent: Aug. 31, 2021

(54) METHOD OF EXTRACTING UNDERGROUND RESOURCES BY USING HYDROLYSABLE PARTICLES

(71) Applicant: TOYO SEIKAN GROUP HOLDINGS, LTD., Tokyo (JP)

(72) Inventors: Seishi Yoshikawa, Yokohama (JP); Tsutaki Katayama, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 15/545,446

(22) PCT Filed: Feb. 4, 2016

(86) PCT No.: PCT/JP2016/053401
§ 371 (c)(1),
(2) Date: Jul. 21, 2017

(87) PCT Pub. No.: WO2016/129501
PCT Pub. Date: Aug. 18, 2016

(65) Prior Publication Data
US 2018/0010037 A1    Jan. 11, 2018

(30) Foreign Application Priority Data

Feb. 12, 2015  (JP) .............................. JP2015-025590
Feb. 12, 2015  (JP) .............................. JP2015-025591
Feb. 12, 2015  (JP) .............................. JP2015-025592

(51) Int. Cl.
*C09K 8/80* (2006.01)
*C08J 3/12* (2006.01)
(Continued)

(52) U.S. Cl.
CPC ................ *C09K 8/80* (2013.01); *C08G 63/16* (2013.01); *C08J 3/12* (2013.01); *C09K 8/665* (2013.01);
(Continued)

(58) Field of Classification Search
None
See application file for complete search history.

(56) References Cited

U.S. PATENT DOCUMENTS

| 8,393,395 B2 | 3/2013 | Cochet et al. |
| 2005/0027081 A1* | 2/2005 | Okushita ................ C08L 67/02 |
| | | 525/419 |

(Continued)

FOREIGN PATENT DOCUMENTS

| EA | 200701378 A1 | 6/2008 |
| JP | 2005-97590 A | 4/2005 |

(Continued)

OTHER PUBLICATIONS

English Translation of Yoshikawa (JP 2014/134090), Jul. 2014 (Year: 2014).*

(Continued)

*Primary Examiner* — Ronak C Patel
(74) *Attorney, Agent, or Firm* — Sughrue Mion, PLLC

(57) ABSTRACT

A method of extracting underground resources including a step of mixing hydrolysable particles and a proppant to an aqueous dispersion fluid, and introducing the fluid with pressure into an ore chute formed under the ground, wherein as the hydrolysable particles, use is made of spherical particles that include a hydrolysable resin of a weight average molecular weight (Mw) of not less than 5,000 and, specifically, not less than 10,000, and that have an average particle size ($D_{50}$) in a range of 300 to 1,000 μm, and a circularity of a short diameter/long diameter ratio of not less (Continued)

than 0.8. The spherical particles have a hyrolysable capability, a circularity and a particle size adapted to the hydraulic fracturing.

2 Claims, 4 Drawing Sheets

(51) Int. Cl.
  *C08G 63/16* (2006.01)
  *E21B 43/267* (2006.01)
  *E21B 33/13* (2006.01)
  *E21B 43/34* (2006.01)
  *C09K 8/66* (2006.01)
  *C09K 8/68* (2006.01)

(52) U.S. Cl.
  CPC ............... *C09K 8/68* (2013.01); *E21B 33/13* (2013.01); *E21B 43/267* (2013.01); *E21B 43/34* (2013.01); *C08J 2367/04* (2013.01)

(56) References Cited

U.S. PATENT DOCUMENTS

| | | | |
|---|---|---|---|
| 2005/0263916 A1 | 12/2005 | Lanphere et al. | |
| 2006/0185848 A1 | 8/2006 | Surjaatmadja et al. | |
| 2008/0236823 A1 | 10/2008 | Willberg et al. | |
| 2009/0286700 A1 | 11/2009 | Lesko et al. | |
| 2009/0311337 A1* | 12/2009 | Tanahashi | A61K 9/0019 424/497 |
| 2010/0307744 A1* | 12/2010 | Cochet | C09K 8/536 166/250.12 |
| 2011/0201069 A1* | 8/2011 | Yoshikawa | C08J 11/105 435/145 |
| 2011/0240293 A1 | 10/2011 | Lesko et al. | |
| 2013/0252854 A1* | 9/2013 | Abe | C09K 8/12 507/117 |
| 2014/0083717 A1* | 3/2014 | Frazier | E21B 33/134 166/376 |
| 2015/0027703 A1* | 1/2015 | Zhu | C09K 8/68 166/280.2 |
| 2015/0072903 A1 | 3/2015 | Abe et al. | |
| 2015/0175874 A1 | 6/2015 | Ueno et al. | |
| 2015/0299553 A1 | 10/2015 | Yoshikawa et al. | |
| 2015/0315891 A1 | 11/2015 | Yoshikawa | |
| 2015/0361326 A1 | 12/2015 | Masaki et al. | |
| 2016/0215206 A1 | 7/2016 | Maeda et al. | |
| 2016/0319177 A1 | 11/2016 | Yoshikawa | |

FOREIGN PATENT DOCUMENTS

| | | | |
|---|---|---|---|
| JP | 2007-146146 A | | 6/2007 |
| JP | 2007-291323 A | | 11/2007 |
| JP | 2008-502463 A | | 1/2008 |
| JP | 2010-138390 A | | 6/2010 |
| JP | 2014-134090 | * | 7/2014 |
| JP | 2014-134090 A | | 7/2014 |
| JP | 2014-134091 A | | 7/2014 |
| JP | 2014-177618 A | | 9/2014 |
| WO | 2012/050187 A1 | | 4/2012 |
| WO | 2013/052252 A1 | | 4/2013 |
| WO | 2014/045815 A1 | | 3/2014 |
| WO | 2014/112479 A1 | | 7/2014 |
| WO | 2015/012088 A1 | | 1/2015 |
| WO | 2015/013112 A1 | | 1/2015 |

OTHER PUBLICATIONS

Communication dated Jul. 26, 2018 issued by the Intellectual Property Office of Russian Federation in counterpart application No. 2017-131639.
International Search Report of PCT/JP2016/053401, dated Apr. 12, 2016. [PCT/ISA/210].
Communication dated Jan. 8, 2019, from the Japanese Patent Office in counterpart application No. 2015-025591.
Communication, dated Sep. 7, 2018, issued in corresponding European Patent Application No. 16749145.5, 6 pages.
Communication dated Jan. 22, 2019, from the Japanese Patent Office in counterpart application No. 2015-025590.

* cited by examiner

METHOD OF EXTRACTING UNDERGROUND RESOURCES BY USING HYDROLYSABLE PARTICLES

CROSS REFERENCE TO RELATED APPLICATIONS

This application is a National Stage of International Application No. PCT/JP2016/053401 filed Feb. 4, 2016, claiming priority based on Japanese Patent Application Nos. 2015-025590, filed Feb. 12, 2015, 2015-025591, filed Feb. 12, 2015, and 2015-025592, filed Feb. 12, 2015, the contents of all of which are incorporated herein by reference in their entirety.

TECHNICAL FIELD

This invention relates to a method of extracting the underground resources by using hydrolysable particles. The invention, further, relates to hydrolysable particles used for the method of extraction.

BACKGROUND ART

Hydrolysable resins as represented by the polylactic acid have excellent biodegradable property. From the standpoint of improving environments, therefore, study has now been forwarded to use them to substitute for plastic materials in a variety of fields, and some of them have now been put into practical use.

In recent years, furthermore, it has been proposed to use them as additives that are to be added to the excavation fluid used for extracting the underground resources (see patent documents 1 to 3).

To extract the underground resources, for example, there has now been widely employed an ore chute excavation method called hydraulic fracturing method. This excavation method consists of pressurizing the excavation fluid filled in the ore chute to form cracks (fractures) in the vicinities of the ore chute to thereby improve permeability in the vicinities of the ore chute (for easy flow of the fluid) in an attempt to increase the effective sectional area through which the resources such as oils and gases flow into the ore chute and, therefore, in order to improve productivity of the ore chute. The excavation fluid is also called fracturing fluid. So far, a viscous fluid like jelly gasoline was used. Recently, however, as the shale gas or the like gas has now been extracted from the shale layer that exists in relatively shallow places and by taking the effects on the environment into consideration, it is becoming a common practice to use an aqueous dispersion solution obtained by dissolving or dispersing polymer particles in water. As such polymers, there have been proposed hydrolysable resins like polyoxalate and polylactic acid.

That is, if the excavation fluid obtained by dispersing the hydrolysable particles in water is filled in the ore chute and is pressurized therein, the particles permeate into the vicinities of the ore chute and serve as a filler (sealing material) for the cracks (fractures) that have been formed already making it possible to temporarily and effectively shut off the flow passage through which the resources such as gases and oils flow.

In general, to form cracks in the ore chute, a preliminary blasting called perforation is executed in the horizontal ore chute. Due to the preliminary blasting, there are formed relatively large cracks as well as a number of small cracks deep in the ore chute. Thereafter, the excavation fluid (fracturing fluid) is flown with pressure into the ore chute. Namely, the fluid flows into the cracks thereby exerting load to the cracks. Namely, the cracks grow into sizes large enough for suitably extracting the resources. Here, the cracks formed earlier are temporarily closed with the above-mentioned hydrolysable resin particles whence the cracks are more effectively formed due to the subsequent fluid pressure. The additive added to the fluid for temporarily closing the cracks is called diverting agent.

The hydrolysable particles undergo the hydrolysis with water and enzymes in the ground, and extinguish. Therefore, the hydrolyzing particles do not have to be removed in the subsequent step, and the ore chute can be efficiently excavated.

Here, the temperature in the ore chute varies depending upon the depth. Namely, the temperature in the ore chute widely varies from about 40° C. to about 200° C., and an optimum hydrolysable resin to be used is determined depending on the temperature in the ore chute in which cracks are formed for extracting the resources. Specifically, when the resources are extracted from a relatively shallow stratum like the case of shale gases, the temperature in the ore chute is in many cases not higher than 100 degrees centigrade. In this case, it is desired to use the polylactic acid or the like that is highly hydrolysable, highly biodegradable but does not cause any environmental contamination.

Specifically, the polylactic acid has an advantage in that it is not expensive, and is greatly expected to be used as an extracting fluid since it must be used in large amounts.

When the hydrolysable particles are to be used being added to the dispersion solution for excavation, there arise problems in regard to the shape of the particles and the size of the particles. Namely, the hydrolysable particles are introduced into the cracks (fractures) formed in the ground and work to close the cracks or to prevent the cracks from collapsing. It is, therefore, required that the hydrolysable particles have a granular shape close to spheres and have suitable particle sizes. For example, if the granular shape is amorphous which is far from the spherical shape (i.e., particles have circularity of a low degree), the particles cannot be easily introduced with pressure into the cracks. Or, despite the particles are introduced into the cracks, voids are much formed and it becomes difficult to effectively prevent the gases from flowing out of the cracks. Moreover, the particles which are too large cannot be easily permeated into the cracks. The particles which are too small, on the other hand, must be used in very large amounts to close the cracks.

So far, however, there has not been known any hydrolysable particles having particle sizes adapted to the hydraulic fracturing. Besides, almost no study has been made in connection with the forms of particles of these kinds.

PRIOR ART DOCUMENTS

Patent Documents

Patent document 1: JP-A-2014-134090
Patent document 2: JP-A-2014-134091
Patent document 3: JP-A-2014-177618

OUTLINE OF THE INVENTION

Problems that the Invention is to Solve

It is, therefore, an object of the present invention to provide a method of extraction by using hydrolysable particles that have a hydrolysable capability, a circularity and a particle size adapted to the hydraulic fracturing.

Another object of the invention is to provide hydrolysable particles having a granular form most suited for the method of extraction.

Means for Solving the Problems

According to the present invention, there is provided a method of extracting underground resources including a step of mixing hydrolysable particles and a proppant to an aqueous dispersion fluid, and introducing the fluid with pressure into an ore chute formed under the ground, wherein as the hydrolysable particles, use is made of spherical particles that include a hydrolysable resin of a weight average molecular weight Mw) of not less than 5,000 and, specifically, not less than 10,000, and that have an average particle size ($D_{50}$) in a range of 300 to 1,000 µm, and a circularity of a short diameter/long diameter ratio of not less than 0.8.

In the above method of extraction, a polylactic acid or a polyoxalate can be preferably used as the hydrolysable resin that forms hydrolysable particles. Specifically, the polyoxalate should have a branched copolymer unit that stems from a trifunctional or more highly functional alcohol or acid.

More preferred hydrolysable resin has a dispersion structure in which fine polymer particles are distributed in a hydrolysable matrix resin, the fine polymer particles being more easily hydrolysable than the matrix resin.

By selecting the kinds of the hydrolysable matrix resin and the easily hydrolysable polymer and on condition that both of them have weigh average molecular weights of not less than 5,000 and, specifically, not less than 10,000, it is desired that the hydrolysable particles including the hydrolysable resin have properties so adjusted that if their hydrolysable capabilities are represented by the weight-retaining ratios after dipped in water of 70° C. for 168 hours, the hydrolysable particles exhibit the weight-retaining ratio of not more than 50% and the matrix resin contained in the hydrolysable particles exhibits the weight-retaining ratio of not less than 90%.

For instance, the properties can be adjusted by selecting a polylactic acid as the matrix resin and selecting a polyoxalate as the easily hydrolysable polymer.

According to the present invention, further, there are provided the hydrolysable particles to be added to a fluid that is introduced with pressure into an ore chute at the time of extracting the underground resources.

Effects of the Invention

According to the method of extraction of the present invention, hydrolysable particles and proppants are mixed into an aqueous dispersion fluid which is then introduced with pressure into an ore chute formed in the ground. Here, the hydrolysable particles added into the dispersion fluid are introduced into cracks formed in the ore chute and work to temporarily close the cracks. Namely, upon introducing the hydrolysable particles into the cracks that are formed by perforation (preliminary blasting) or the like to temporarily close the cracks, it is made possible to further form or grow the cracks by the pressure of the fluid that is subsequently introduced. The cracks in which the hydrolysable particles have been introduced work to effectively suppress the gases from flowing out. Therefore, the hydraulic pressure can be effectively applied to other places (e.g., places where fine cracks are being formed) to promote further growth of fine cracks.

After the passage of a predetermined period of time, the hydrolysable particles undergo the hydrolysis and extinguish. As a result, the gases in the ground flow into the cracks; i.e., the gases flowing out through the cracks are extracted. Here, the proppant works to sustain the cracks. Namely, after the hydrolysable particles have extinguished, a hollow channel structure is formed in the cracks which, therefore, could easily collapse due to the pressure in the ground. The proppant introduced into the cracks works to effectively prevent the cracks from collapsing and, therefore, the resource gases can be efficiently extracted through the cracks.

As the proppant, in general, inorganic particles such as grains of sand are used. There is no limitation on the form of the particles provided they are of a size that can be introduced into the cracks. It is, however, desired that the hydrolysable particles are of a size that can be introduced into the cracks and that, at the same time, densely fills in the cracks to close the cracks. Therefore, the hydrolysable particles must have a shape close to a sphere and a certain degree of strength.

In fact, the hydrolysable particles with such properties have not, so far, been produced. The present inventors, however, have succeeded in producing the hydrolysable particles of this kind by employing a specific method.

Namely, the present invention uses hydrolysable particles of a form that had not been, so far, been produced, or, concretely, the hydrolysable particles having an average particle size ($D_{50}$) in a range of 300 to 1,000 µm, a circularity of a short diameter/long diameter ratio of not less than 0.8, and a weight average molecular weight (Mw) of not less than 5,000 (specifically, not less than 10,000 and, more preferably, not less than 50,000). The hydrolysable particles of this kind (particle sizes are lying within a predetermined range) can be quickly introduced into the cracks, are capable of maintaining their predetermined granular shape (weight average molecular weight is not less than a predetermined range) for a predetermined period of time, can be densely filled (have a high degree of circularity) in the cracks so will not to develop voids, and work to effectively and temporarily close the cracks.

The extracting method of the present invention includes the step of mixing hydrolysable particles having predetermined properties and a proppant to an aqueous dispersion fluid, and introducing the fluid with pressure into an ore chute. According to this method, the cracks can be effectively and temporarily closed, and the cracks can be effectively grown or the operation can be effectively carried out for growing the cracks. Besides, after the hydrolysable particles have been extinguished, the cracks can be effectively sustained enabling the resource gases and, specifically, the shale gases to be efficiently extracted through the cracks.

MODES FOR CARRYING OUT THE INVENTION

Hydrolysable Particles

Figure 1:
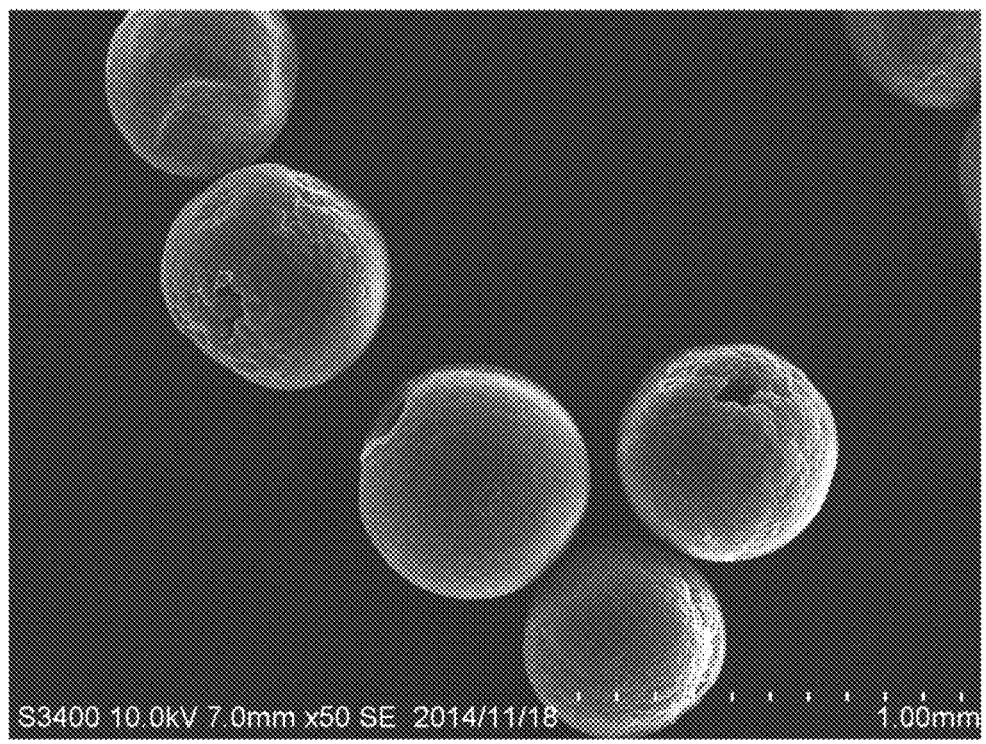
FIG. 1 An electron microphotograph (magnification of 50 times) showing hydrolysable particles of a polylactic acid used in the present invention.
Figure 2:
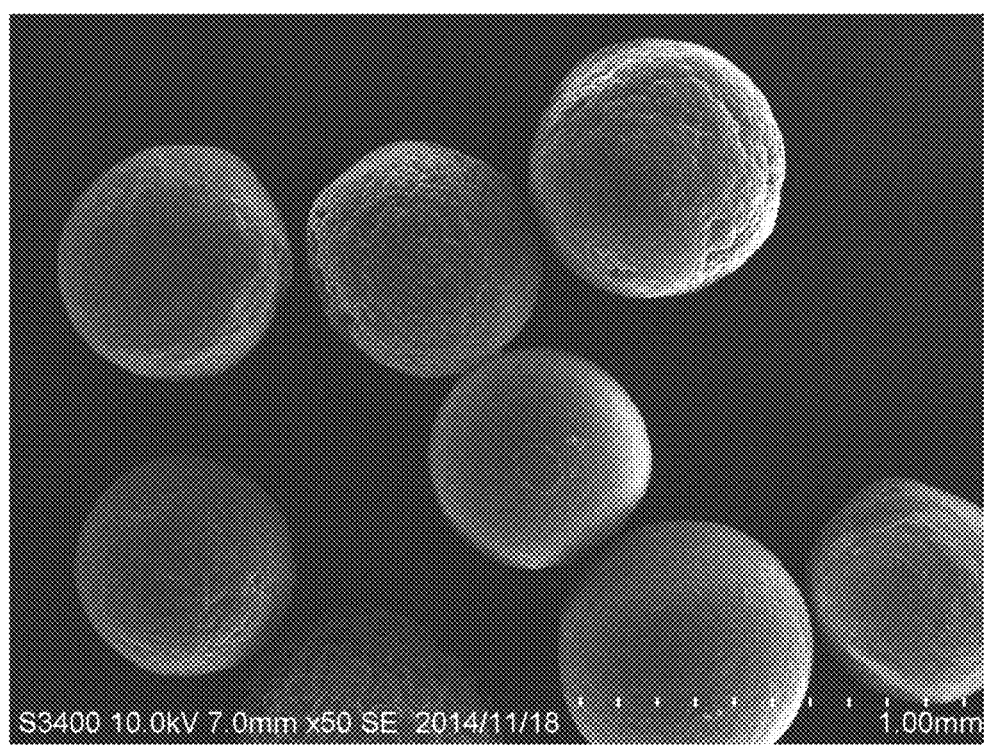
FIG. 2 An electron microphotograph (magnification of 50 times) showing hydrolysable particles of a polyoxalate used in the present invention.

As shown in microphotographs of FIG. 1 (particles of a polylactic acid) and FIG. 2 (particles of a polyoxalate), the hydrolysable particles used in the present invention have a high degree of sphericalness. For instance, the circularity represented by a short diameter/long diameter ratio is not less than 0.8 and is, specifically, very close to 1.

The particles have an average particle size ($D_{50}$) in a range of 300 to 1000 μm on the volume basis as measured by the laser diffraction•light scattering method.

Namely, the hydrolysable particles of the present invention have a high degree of sphericalness as described above and a particle size adapted to be introduced into the cracks formed in the ore chute by the hydraulic fracturing. Therefore, the hydrolysable particles are introduced into the cracks formed in the ore chute by the hydraulic fracturing; i.e., the hydrolysable particles serving as a so-called diverting agent exhibit excellent function of temporarily closing the cracks.

If, for example, the degree of sphericalness is lower than the above range, the hydrolysable particles poorly exhibit their function for closing the cracks despite they are introduced into the cracks. Namely, the gases cannot be effectively suppressed from flowing out through the cracks, deteriorating the efficiency of operation for further forming the cracks by utilizing the pressure of the fluid. Further, if the particle size is larger than the above range, it becomes difficult to introduce the particles into the cracks. Moreover, if the particle size is smaller than the above range, it becomes difficult to effectively close the cracks. Besides, in handling the hydrolysable particles, there tends to occur such a problem as flying and scattering of powder.

As described above, the hydrolysable particles of the invention assume a form adapted to be added to the dispersion fluid for excavation by hydraulic fracturing at the time of executing the hydraulic fracturing, and have an angle of repose of not more than 50 degrees, which is very smaller than that of the particles of this kind.

Further, the hydrolysable particles include a hydrolysable resin and must have a weight average molecular weight (Mw) of not less than 5000 to exhibit a predetermined particle strength. If the hydrolysable resin having a too small weight average molecular weight (Mw) is used, the particle strength cannot be maintained to lie in a suitable range, and the particles easily collapse and can no longer maintain the shape of particles. Besides, the hyrolysable particles become highly hydrolysable. Therefore, even if they are added to the dispersion fluid for hydraulic fracturing and are fed into the cracks formed in the ore chute, the hydrolysable particles readily undergo the hydrolysis and become no longer capable of exhibiting the function of temporarily closing the cracks.

Representative examples of the hydrolysable resin include polylactic acid and polyoxalate. Particularly preferably, the hydrolysable resins have an island-sea structure as will be described below.

1. Polylactic Acids;

The polylactic acid used for forming the hydrolysable particles having the above-mentioned form may be either a 100% poly-L-lactic acid or a 100% poly-D-lactic acid. Or, the polylactic acid may be a molten blend of the poly-L-lactic acid and the poly-D-lactic acid, or a random copolymer or a block copolymer of the L-lactic acid and the D-lactic acid.

Further, the polylactic acid may have been copolymerized with small amounts of various kinds of copolymerizable components within a range in which the hydrolyzing property of the polylactic acid is not impaired. As the copolymerizable components, there can be exemplified polyhydric alcohols such as ethylene glycol, propylene glycol, butanediol, hexanediol, octanediol, dodecanediol, neopentyl glycol, glycerin, pentaerythritol, sorbitan, bisphenol A, and polyethylene glycol; dicarboxylic acids such as oxalic acid, succinic acid, adipic acid, sebacic acid, glutaric acid, decanedicarboxylic acid, cyclohexanedicarboxylic acid, terephthalic acid, isophthalic acid and anthracenedicarboxylic acid, and diesters thereof; hydroxycarboxylic acids such as glycolic acid, L-lactic acid, D-lactic acid, hydroxypropionic acid, hydroxybutylic acid, hydroxyvaleric acid, hydroxycaproic acid, manderic acid and hydroxybenzoic acid; and lactones such as glycolide, caprolactone, butylolactone, valerolactone, propiolactone and undecalactone.

It is, further, desired that the polylactic acid has a weight average molecular weight (Mw) of not less than 10,000 and, specifically, in a range of 50,000 to 500,000 from such a standpoint that the particles thereof maintain the strength of a suitable degree and stably maintain their granular form at least during the excavation operation. That is, the particles formed by using the polylactic acid tend to have a decreased strength as compared to that of the polyoxalate that will be described later and, therefore, must have a relatively large weight average molecular weight. If the weight average molecular weight is too large, however, the particles have a decreased hydrolyzing property and continue to remain in the cracks hindering the extraction of gases. It is, therefore, desired that the polylactic acid has an upper-limit weight average molecular weight (Mw) of 500,000.

The polylactic acid may have its hydrolyzing property adjusted by being mixed with other hydrolysable resins (such as polyoxalate, polyglycolic acid and the like) in small amounts so far as they do not impair excellent properties of the polylactic acid. As required, further, the polylactic acid may be blended with additives such as known plasticizer, heat stabilizer, photo stabilizer, antioxidant, ultraviolet-ray absorber, flame-retarding agent, coloring agent, pigment, filler, parting agent, antistatic agent, perfume, lubricant, foaming agent, antibacterial•antifungal agent, nucleating agent and the like. To control the crystallinity, furthermore, the polylactic acid may be added with components that are compatible therewith, such as cellulose derivatives, polymethylmethacrylate, and vinyl polyacetate.

2. Polyoxalates;

The polyoxalate is a polyester having a structure in which oxalic acid esters are linked together. Upon the hydrolysis, the polyoxalate releases an oxalic acid which works to further promote the hydrolysis. Therefore, the polyoxalate exhibits a high degree of hydrolyzing capability.

Usually, from the standpoint of being used for the extraction of shale gases, it is desired that the hydrolysable particles exhibit hydrolyzing capability of a suitable degree in a low-temperature region of, particularly, 40 to 80° C. This is because the shale gases are extracted from the shale layer that is present in places relatively shallow in the ground. Therefore, the dispersion solution used for the excavation is, in many cases, thrown into an ore chute which is in the above-mentioned temperature region, and it is required that the hydrolyzing capability of a suitable degree is exhibited in this temperature region. Use of the polyoxalate is desired from the standpoint of maintaining a suitable degree of hydrolyzing capability suited for extracting the shale gases.

If the hydrolysable capability is represented by the weight reduction ratio after dipped in water of 70° C. for 168 hours, the hydrolysable capability of a suitable degree (weight-holding ratio) is not more than 60% and, preferably, not more than 50%. That is, if the hydrolysable capability is low and the weight reduction ratio is too small, the hyrolysable particles remain in the cracks for extended periods of time without being hydrolyzed despite having been added to the dispersion solution for hydraulic fracturing that will be described later and having been introduced into the cracks. On the other hand, if the hydrolysable capability is high and the weight reduction ratio is too large, the hydrolysable particles may collapse due to the hydrolysis before being introduced into the cracks. Moreover, due to the hydrolysis on the ground, the particles melt-adhere together and cannot be fed into the cracks. It is, therefore, desired that the weight reduction ratio measured under the above-mentioned conditions lies within the above-mentioned range.

Further, if compared with the polylactic acid, the polyoxalate, despite of its low molecular weight, is capable of maintaining a large strength of particles and should, desirably, have a weight average molecular weight (Mw) in a range of 5,000 to 200,000. If the polyoxalate having a too small weight average molecular weight (Mw) is used, the particles thereof cannot maintain a strength in a suitable range, become easily collapsible, cannot maintain the shape of particles and become too highly hydrolysable. Therefore, despite of being added to the dispersion solution used for the hydraulic fracturing so as to be fed into the cracks formed in the ore chute, the polyoxalate particles readily undergo the hydrolysis and can no longer exhibit the function of temporarily closing the cracks. Besides, if the weight average molecular weight becomes greater than the above range, the polyoxalate particles become lowly hydrolysable, continue to stay in the cracks and may hinder the extraction of gases.

Among the polyoxalates, furthermore, the present invention, particularly preferably, uses a polyoxalate copolymer having a branched structure introduced in the molecules thereof. Namely, owing to the branched structure introduced in the molecules thereof, the polyoxalate copolymer has a dense molecular structure. As compared to, for example, a polyoxalate (unmodified polyoxalate) into which no such molecular structure has been introduced, therefore, the polyoxalate copolymer exhibits a very low rate of hydrolysis just after it is thrown into water until the passage of 12 hours and yet exhibits a rate of hydrolysis which is comparable to that of the unmodified polyoxalate after 24 hours have passed from when it was thrown into water. Namely, though the polyoxalate copolymer exhibits a hydrolysable capability (long-term hydrolysable capability) comparable to that of the unmodified polyoxalate, its initial hydrolysable capability is very low as compared with that of the unmodified polyoxalate. Presumably, permeation of water is greatly suppressed by the dense molecular structure accounting for a decrease in the initial hydrolysable capability.

The polyoxalate copolymer into which the branched structure is introduced includes main ester units of oxalate linked together like a straight chain and branched ester copolymer units derived from a trifunctional or more highly functional alcohol or acid, and has a weight average molecular weight (Mw), desirably, in the above-mentioned range (5,000 to 200,000) and, specifically, in a range of not less than 10,000.

In the polyoxalate copolymer, the main ester units of oxalate linked together like a straight chain are represented by the following formula (1):

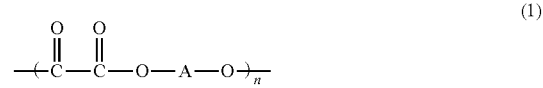

wherein, n is a positive number, and
A is a divalent organic group.

In the main ester unit, the divalent organic group A is an organic residue of dialcohol that is capable of forming an ester with an oxalic acid.

As the oxalic acid diester used for introducing the main ester unit, there is preferably used a dialkyl oxalate, or an alkyl group having 1 to 4 carbon atoms, such as dimethyl oxalate, diethyl oxalate or propyl oxalate. Most desirably, there is used the dimethyl oxalate or the diethyl oxalate from the standpoint of interchanging esters.

As the dialcohol used for introducing the main ester unit, there can be exemplified ethylene glycol, 1,3-propanediol, propylene glycol, butanediol, hexanediol, octanediol, dodecanediol, neopentyl glycol, bisphenol A, and cyclohexane dimethanol. Among them, it is desired to use a fatty dialcohol and, specifically, a straight-chain divalent alcohol, such as ethylene glycol, propylene glycol, butanediol, hexanediol, octanediol, and dedecanediol from the standpoint of long-term hydrolysable capability and less effect upon the environment. Specifically, it is most desired to use the butanediol from the standpoint that the initial hydrolysable capability can be highly suppressed by the introduction of the branched ester copolymer unit.

Moreover, the main ester unit may be copolymerized with a dicarboxylic acid (e.g., cyclohexanedicarboxylic acid or phthalic acid) having an aliphatic ring or an aromatic ring within a range in which it does not impair the desired hydrolysable capability, for example, in an amount of not more than 20 mol % and, specifically, not more than 5 mol % the oxalic acid.

The branched ester copolymer unit is represented by, for example, the following formula (2) or (3):

wherein,
P is a reside of a trifunctional or more highly functional alcohol used for introducing the branched ester copolymer unit,
Q is a residue of a trifunctional or more highly functional acid used for introducing the branched ester copolymer unit, A is a divalent organic group like the one defined in the above formula (1), and r is a valence of the trifunctional or more highly functional alcohol or acid.

Since the branched structure is formed with the branched copolymer units being introduced into the straight-chain main ester units, the polyoxalate copolymer initially exhibits a hydrolysable capability in a suppressed manner and, thereafter, exhibits a long-term hydrolysable capability maintained on a high level.

In the branched ester copolymer unit (hereinafter often called simply branched unit), it is desired that not more than 18 carbon atoms are possessed by either the residue (P in the formula (2)) of the trifunctional or more highly functional alcohol or the residue (Q in the formula (3)) of the trifunctional or more highly functional acid. This is because if these residues P and Q are long chains, then the branched structure exhibits decreased effect for lowering the initial hydrolysable capability.

As the trifunctional or more highly functional alcohols having a residue with the above-mentioned numbers of carbons, there can be exemplified polyfunctional aliphatic alcohols like triols, such as glycerin, trimethylolmethane, trimethylolethane and trimethylolpropane, and tetraols such as tetramethylolmethane (pentaerythritol), etc. As the trifunctional or more highly functional acids, there can be exemplified aliphatic tricarboxylic acids such as propanetricarboylic acid and cyclohexanetricarboxylic acid; aliphatic tetracarboxylic acids such as ethylenetetracarboxylic acid and the like acids; aromatic tricarboxylic acids such as trimellitic acid and the like acids; and aromatic tetracarboxylic acids such as benzenetetracarboxylic acid, biphenyltetracarboxylic acid and benzophenonetetracarboxylic acid, and acid anhydrides thereof.

In the invention, from such a standpoint that the long-term hydrolysable capability is not impaired, it is desired that the branched ester copolymer units are introduced by the trifunctional or more highly functional alcohol or, for example, that the straight-chain ester copolymer units are introduced by the pentaerythritol.

The branched units are desirably introduced in an amount of 0.01 to 1.0 mol % the main ester units that are linked together like a straight chain. If the amount of the branched ester copolymer units is too small, the effect becomes small for suppressing the initial hydrolysable capability. If the branched units are introduced in unnecessarily large amounts, on the other hand, the straight-chain main ester units linked to the branched units acquire a decreased molecular weight. Besides, the particles contain an increased amount of components that are insoluble in the solvent (gel percentage increases); i.e., formability of particles greatly decreases and it may become difficult to form the particles.

The polyoxalate copolymer into which the branched structure has been introduced is produced by using an oxalic acid source (oxalic acid or oxalic acid ester) for forming the straight-chain main ester units, a divalent alcohol component, a polyhydric alcohol component or a polybasic acid component for forming the branched units, and a catalyst, and by conducting the polycondensation reaction in a customary manner such that the branched units are formed at the above-mentioned ratio.

Here, representative examples of the catalyst are those compounds of P, Ti, Ge, Zn, Fe, Sn, Mn, Co, Zr, V, Ir, La, Ce, Li, Ca and Hf. Particularly preferred compounds are organotitanium compound and organotin compounds, such as titanium alkoxide, dibutyltin dilaurate and butyltin hydroxide oxide hydrate because of their high degree of activity.

In conducting the polycondensation reaction, if necessary, a heat stabilizer may be added to prevent the thermal deterioration. Further, a catalyst deactivator may be added to discontinue the polymerization.

After the synthesis of the polyoxalate including the above-mentioned straight-chain main ester units, the polyfunctional alcohol or the polybasic acid component is added in a subsequent step to form branched units followed by the polycondensation reaction or the ester-interchange reaction to produce the desired polyoxalate copolymer.

In the subsequent step, it is also allowable to introduce the polyfunctional component by adding, by using an extruder, the trifunctional or more highly functional component while the straight-chain polyoxalate is being melted, and melting and mixing them together.

The polyoxalate copolymer obtained as described above includes the branched units introduced therein as the copolymer ester units. Here, it is desired that the amount of introduction thereof is so adjusted that the amount of components insoluble in the solvent (gel percentage) is in a range of not less than 1% by mass but not more than 70% by mass as measured with the dichloromethane of 23° C. from the standpoint of lowering the initial hydrolysable capability. Desirably, the amount of components insoluble in the solvent is not less than 10% by mass but not more than 70% by mass and, more desirably, not less than 30% by mass but not more than 70% by mass. As described earlier, the effect for lowering the initial hydrolysable capability decreases if the branched units are introduced in small amounts and the amount of the components insoluble in the solvent is smaller than the above range, or if the branched units are introduced in large amounts and the amount of the components insoluble in the solvent is larger than the above range.

The above-mentioned polyoxalate may be blended with other hydrolysable resins (e.g., polylactic acid, polyglycolic acid, etc.) in small amounts so far as they do not impair excellent properties of the polyoxalate, or, as required, may be blended with various known additives like in the case of the polylactic acid.

3. Hydrolysable Resins Having an Island-Sea Structure;

The hydrolysable resins of this type have a dispersion structure in which fine polymer particles (hydrolysable resin particles present like islands) are distributed in a hydrolysable matrix resin (hydrolysable resin present like the sea), the fine polymer particles capable of being more easily hydrolyzed than the matrix resin. Namely, in the hydrolysable resin particles, the easily hydrolysable polymer exhibits a function of adjusting the hydrolysable capability of the hydrolysable particles and is protected by the matrix resin. Namely, the easily hydrolysable polymer has its hydrolysable capability suppressed. This effectively prevents the melt-adhesion of particles caused by the hydrolysis of the easily hydrolysable polymer which, therefore, can be handled with ease. Easy handling of the hydrolysable particles provides a very important advantage since they are used being mixed into the fluid in the site of extracting the underground resources.

As the matrix resin and the easily hydrolysable polymer, there can be used the resins that exhibit a variety of hydrolyzing capabilities. Specifically, there can be preferably used such biodegradable polyesters as polylactic acid, polyhydroxyalkanoate, polyoxalate, polyglycolic acid, polybutylene succinate, polybutylene succinate adipate and polycaprolactone owing to their excellent enzymatically decomposing capabilities in addition to their suitable degrees of hydrolyzing capabilities of when they are used for the hydraulic fracturing. The biodegradable polyesters, upon being used in combination depending on their hydrolysable capabilities, can be used as matrix resins and as easily hydrolysable polymers.

That is, out of the above biodegradable polyesters, those that are sparingly hydrolysable are used as matrix resins and those that are more easily hydrolysable than the matrix resins are used as the polymers for adjusting the hydrolysable capabilities.

In order to maintain a predetermined particle strength, the biodegradable polyester, too, must have a weight average molecular weight (Mw) of not less than 5000 like the above-mentioned polylactic acid and the polyoxalate.

In the invention, it is desired that the matrix resin and the easily hydrolysable polymer are so selected that after dipped in water of 70° C. for 168 hours, the hydrolysable particles exhibit the weight-retaining ratio of not more than 50% and the matrix resin contained therein exhibits the weight-retaining ratio of not less than 90%. From this point of view, the above-mentioned polylactic acid (having the weight-retaining ratio of not less than 90%) is selected as the matrix resin. As the easily hydrolysable polymer, it is desired to select the above-mentioned polyoxalate (specifically, the polyoxalate copolymer containing the trifunctional copolymer units) having the weight-retaining ratio in a range of not more than 50% and polyglycolic acid and, particularly desirably, a polyoxalate. This makes it possible to effectively prevent such an inconvenience that the particles are collapsed by hydrolysis before they are introduced into the cracks and, therefore, makes it possible to have the particles stay in the cracks for predetermined periods of time.

It is, further, desired that the easily hydrolysable polymer is finely distributed and that the dispersed particles have an average particle size in a range of 5 to 0.01 µm, preferably, 3 to 0.1 µm and, more preferably, 3 to 0.5 µm.

In the invention, the easily hydrolysable polymer is distributed in the matrix resin in an amount that secures the above-mentioned weight-retaining ratio. Specifically, if the above-mentioned polyoxalate is used as the easily hydrolysable polymer and in an amount of about 5 to 95 parts by mass and, specifically, about 30 to 80 parts by mass per 100 parts by mass of the polylactic acid, then the weight-retaining ratio (hydrolysable capability) can be adjusted to lie in the above-mentioned range. That is, the fact that the hydrolysable capability can be adjusted with a small amount means that the polyoxalate is coated with a relatively thick layer of polylactic acid. Therefore, the polyoxalate, though very easily hydrolysable, is protected by the thick layer of polylactic acid and is effectively suppressed from undergoing the hydrolysis in an environment near room temperature. Use of the polyoxalate for the dispersion solution for hydraulic fracturing provides very great advantage in preventing the particles thereof from undergoing the melt-adhesion on the ground due to hydrolysis.

Among the polyoxalates, the polyoxalate copolymer that contains the above trifunctional copolymer units and that is used as the easily hydrolyzing polymer, undergoes the hydrolysis at an effectively suppressed rate despite it is partly exposed on the particle surfaces. When used on the ground, therefore, the particles thereof are more effectively prevented from being melt-adhered together, and the operability thereof can be greatly improved.

The polymerizable resin blended with the above matrix resin and the easily hydrolysable polymer, can be, further, blended, as required, with a variety of known additives like the polylactic acid and the polyoxalate described above.

<Production of the Hydrolysable Particles>

The hydrolysable particles including the hydrolysable resin and having a high degree of sphericalness and a suitable degree of particle size are produced by a drop system using a drop nozzle of a single-tube structure or a multiple-tube structure but can be produced with difficulty if any other method is employed.

If, for example, there is used a method of mechanically milling the masses of hydrolysable resin, the sphericalness of particles becomes low, as a matter of course.

If the spherical particles are produced by a system using a bad solvent or by a spray system, the particle sizes become too fine. Even with a strand-cut system by extruding the resin, the particle sizes become too rough.

According to the systems that have heretofore been generally employed as described above, though the particles can be formed in a spherical shape, the particle sizes cannot be adjusted to lie in the above-mentioned range (300 to 1000 µm).

The hydrolysable particles used in the invention are produced by the drop system by using the drop nozzle. The apparatuses for producing the particles by the drop system can be divided into those of a single-tube structure as shown in FIG. 3 and those of a multiple-tube structure as shown in FIG. 4.

Figure 3:
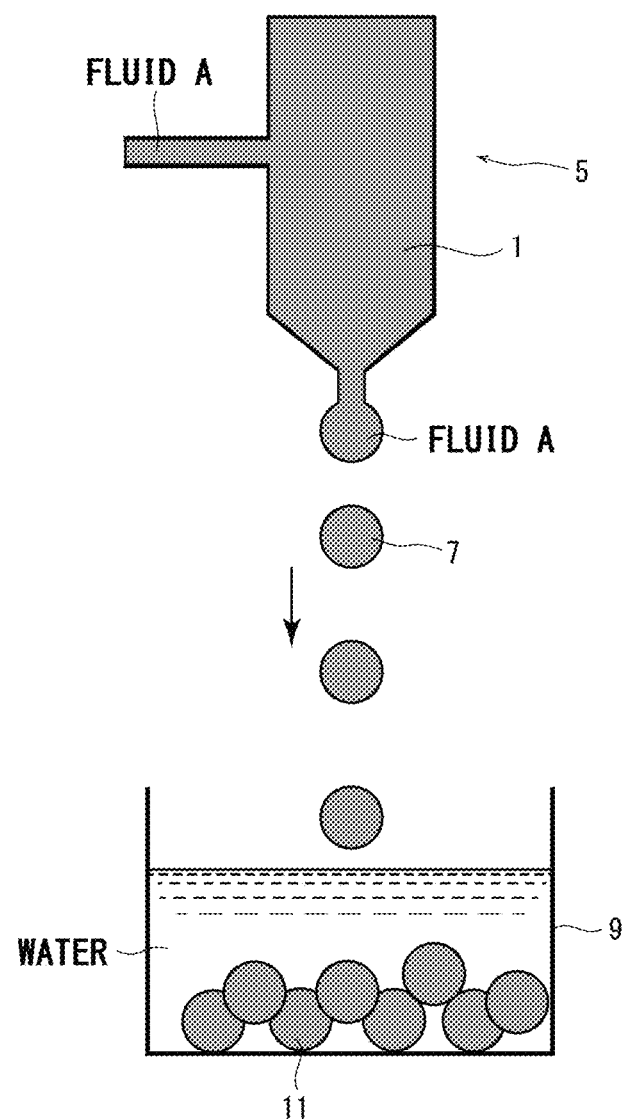
FIG. 3 A view schematically illustrating the structure of a drop-type apparatus for producing particles used for producing the hydrolysable particles of the present invention.
Figure 4:
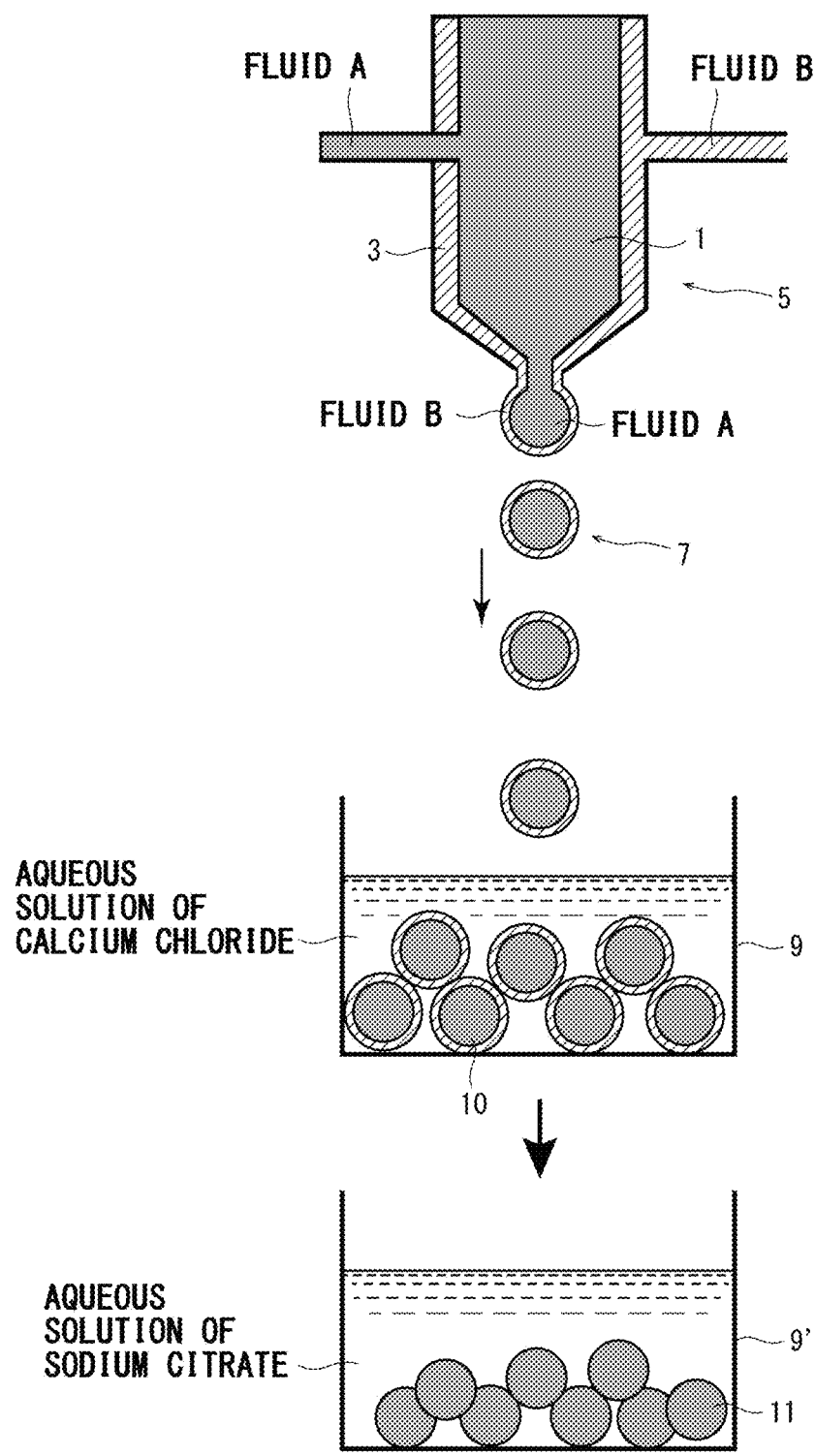
FIG. 4 A view schematically illustrating the structure of another drop-type apparatus for producing particles used for producing the hydrolysable particles of the present invention.

In the apparatus of the single-tube structure of FIG. 3, a fluid A is fed into a single-tube nozzle 5, the fluid drops as droplets 7 from the end thereof, and the fluid falls down maintaining the form of droplets on a receiving vessel 9.

As the fluid A, the above-mentioned hydrolysable resin is used in the form of a fluid (containing agents that are suitably added). As the fluid (fluid A), it is also allowable to feed the hydrolysable resin in a molten form directly into the single-tube nozzle 5. The hydrolysable resin in a molten form, however, has such a large viscosity that it becomes difficult to adjust the flow rate thereof so as to drop in the form of droplets 7 having a predetermined particle size. It is, therefore, desired to adjust the viscosity of the hydrolysable resin to be about 10 to 10,000 mPa·sec (25° C.) by using a predetermined organic solvent and to feed an organic solvent solution of the hydrolysable resin as the fluid A.

As the organic solvent used here, there can be exemplified dichloromethane, chloroform, dimethyl sulfoxide, dimethyl formamide, acetone, toluene and ethyl acetate. The concentration of the organic solvent solution is in a range of, desirably, 10% by weight to 70% by weight.

The droplets from the end of the single-tube nozzle 5 fall on the receiving vessel 9 which is filled with a bad solvent such as water or methanol which is bad for the polyoxalate. The droplets, therefore, precipitate and solidify in the bad solvent and turn into hydrolysable particles 11 having a desired particle size.

In the apparatus of the multiple-tube structure of FIG. 4, a drop nozzle 5 includes a core tube 1 and an outer tube 3, and droplets 7 fall from the nozzle 5 onto a receiving vessel 9 in the same manner as described above.

That is, in this apparatus, a fluid A is fed into the core tube 1 of the drop nozzle 5 and a fluid B is fed into the outer tube 3. Therefore, the fluid droplets 7 from the nozzle 5 have an encapsulated structure with the fluid A as a core and the fluid B as a shell.

In the invention, as the fluid A for forming the core of the fluid droplets 7, there is used the hydrolysable resin in the fluid form like in the case of FIG. 2 and as the fluid B for forming the shell of the fluid droplets 7, there is used an aqueous solution of sodium alginate. Namely, the fluid B prevents the hydrolysable particles from melt-adhering, and works as a particle size-adjusting agent to maintain a predetermined particle size.

By feeding the fluid A into the core tube 1 and by feeding the aqueous solution of sodium alginate as the fluid B so as to drop as droplets, there are formed encapsulated fluid droplets 7 with the fluid A as the core and the fluid B as the shell. Here, to effectively form the encapsulated structure, it is desired that the aqueous solution of sodium alginate used as the fluid B has a viscosity that is adjusted to be about 10 to about 1000 mPa·sec (25° C.), the aqueous solution having a concentration in a range of about 1 to about 5% by mass.

The end of the nozzle 5 has inner diameters (inner diameters of the core tube 1 and the outer tube 3) that are so set that the particles finally obtained have sizes lying within the above-mentioned range and, further, that the fluid A and the fluid B are fed at rates within suitable ranges. Usually, a ratio of the flow rate of the fluid A and the flow rate of the fluid B is suitably set.

The fluid droplets 7 from the end of the nozzle 5 fall in the receiving vessel 9.

The receiving vessel 9 is filled with an aqueous solution of calcium chloride, and in which there precipitate the hydrolysable particles 10 coated with the calcium alginate. The thus precipitated fluid droplets 10 are then dipped in an aqueous solution of sodium citrate filled in a receiving vessel 9' to thereby obtain polylactic acid particles 11 as a result of removing the shell of fluid B from the particles 10.

The hydrolysable particles 11 obtained by using the drop nozzles of FIG. 3 and FIG. 4 are readily recovered from the receiving vessels 9 and 9'. In case the solvent is contained, the hydrolysable particles 11 are suitably thrown into water to remove the solvent. If the hydrolysable particles have been encapsulated by using the apparatus of FIG. 4, the solvent-removing operation may be executed prior to removing the sodium alginate that is covering the particles.

Usually, further, the obtained particles are passed through a sieve to collect only those particles having predetermined particle sizes. The particles are, further, dried with the hot air to use them as the desired polylactic acid particles.

In the foregoing was described an example of using an aqueous solution of sodium alginate as the fluid B for forming the shells. Not being limited thereto only, however, it is also allowable to use, as the fluid B, an aqueous solution of salts that are capable of stably covering the droplets of fluid A and that have a suitable degree of viscosity to prevent the droplets of fluid A from melt-adhering together. It is, further, allowable to suitably select the kind of the aqueous solution filled in the receiving vessel 9 depending on the kind of the fluid B.

<Method of Extraction>

The above-mentioned hydrolysable particles are capable of effectively alleviating such inconveniences as flying of dust and melt-adhesion on the ground, and are, therefore, easy to handle. Besides, the hydrolysable particles are introduced into the cracks that are formed during the hydraulic fracturing and work to temporarily close the cracks. After the passage of a predetermined period of time, the hydrolysable particles undergo the hydrolysis and extinguish Therefore, the hydrolysable particles are favorably used for the preparation of a dispersion solution for excavation such as fracturing fluid that is used in the site of extracting the underground resources. For extracting the shale gases, in particular, the polylactic acid particles and the proppant are mixed into an aqueous dispersion fluid (concretely, water) which is then introduced with pressure into an ore chute that is formed under the ground.

As described earlier, the proppant is used together with the hydrolysable particles in order to sustain the channel structure of the cracks formed as the hydrolysable particles extinguish. Usually, therefore, the proppant includes sand grains or hard inorganic grains (i.e., clay, etc.) having such a grain size that is suited for being quickly introduced into the cracks. Concretely speaking, like the hydrolysable particles, the proppant has grain sizes in a range of not more than 800 μm and, more preferably, not less than 300 μm. This is because if the grain size is very small, the effect for sustaining the cracks decreases.

Water of the aqueous dispersion fluid to which the polylactic acid particles and proppant are added, may, further, be added with a guar gum and xanthan as thickeners to impart a suitable degree of viscosity and to promote the formation of cracks by pressure. Prior to introducing the hydrolysable particles and proppant with pressure, further, salts such as calcium carbonate and the like may be dispersed as water loss-preventing agents and, in this state, the fluid is introduced with pressure to also form a cake on the wall surfaces of the ore chute. Formation of the cake helps prevent the water from permeating into the ground through the wall surfaces of the ore chute and effectively prevents the ore chute from collapsing.

Upon introducing the hydrolysable particles and the proppant with pressure, there are formed a number of cracks. Then as the hydrolysable particles extinguish, there is formed the channel structure in the cracks supported by the proppant. Thereafter, the resource gases such as shale gas and the like are extracted through the cracks. By repeating the introduction of the polylactic acid particles and the proppant with pressure, the cracks can be formed more, as a matter of course.

EXAMPLES

The invention will now be described by the following Experimental Examples.

<Measuring the Melting Points>

Apparatus: DSC 6220 (differential scanning calorimeter) manufactured by Seiko Instruments Co.

Amounts of samples: 5 to 10 mg.

Measuring conditions: Nitrogen atmosphere, elevating the temperature at a rate of 10° C./min. and measuring over a range of 0° C. to 250° C.

The melting point was found from the peak top.

<Measuring the Molecular Weights>

Apparatus: Gel permeation chromatograph GPC

Detector: Differential refractive index detector RI

Column: Super-Multipore HZ-M (two units)

Solvent: Chloroform

Flow rate: 0.5 mL/min.

Column temperature: 40° C.

Preparation of Samples:

Three mL of a solvent was added to about 10 mg of a sample, and the mixture thereof was left to stand at room temperature. After having confirmed with the naked eye that the sample had been dissolved, the solvent was filtered using a 0.45 μm filter. All samples were measured within about one hour from the start of preparation. A polymethyl methacrylate or a polystyrene was used as the standard.

<Measuring the Circularity>

Ten particles arbitrarily selected while observing through the SEM were calculated for their average value of short diameter/long diameter ratios. The average value was regarded to be the circularity.

<Measuring the Hydrolysable Capabilities (Weight-Retaining Ratios)>

A sample powder in an amount 300 mg (initial weight) and 40 ml of distilled water were put into a 50 ml polypropylene (PP) vial which was then stored still in an oven heated at 70° C. After 168 hours have passed, the sample was taken out, dried and was weighed.

The hydrolysable capability after 168 have passed was found according to the following formula, Hydrolysable capability=(weight after 168 hours have passed)/300×100

The powder was the one obtained by crushing the pellets of the sample polymer by using a crusher IMF-800DG manufactured by Iwatani corporation and passing the powder through a mesh of a perforation size of 1 mm one time.

<Synthesis of the Polybutylene Oxalate (PBOx)>

Into a one-liter separable flask equipped with a mantle heater, a thermometer for measuring the fluid temperature, a stirrer, a nitrogen introduction pipe and a distillation column, there were introduced:
  oxalic acid, 180 g (2 mols),
  1,4-butanediol, 216 g (2.4 mols), and
  dibutyltin dilaurate, 0.24 ml,
and the mixture thereof was polymerized under normal pressure in a nitrogen stream by elevating the fluid temperature in the flask up to 120° C. After the condensed water started distilling off, the fluid temperature was elevated little by little up to 150° C., and the polymerization was continued under normal pressure. Finally, there was obtained 72 ml of a distillate.

Thereafter, the fluid temperature in the flask was elevated stepwise up to 230° C., and the polymerization was executed under a reduced pressure of 0.1 kPa to 0.8 kPa. The formed polymer was taken out, cooled with the fluid nitrogen and was crushed by using the crusher so as to be granulated. The obtained polymer (PBOx) exhibited the following properties.
  Melting point: 105° C.
  Mw (weight average molecular weight): 85800
    (using a polystyrene as the standard)
  Hydrolysable capability (weight-retaining ratio): 3.5%

<Synthesis of the Polyethylene Oxalate (PEOx)>

Into the one-liter separable flask equipped with a mantle heater, a thermometer for measuring the fluid temperature, a stirrer, a nitrogen introduction pipe and a distillation column, there were introduced:
  dimethyl oxalate, 472 g (4 mols),
  ethylene glycol, 297 g (4.8 mols), and
  tetrabutyl titanate, 0.40 g,
and the mixture thereof was polymerized under normal pressure in a nitrogen stream by elevating the fluid temperature in the flask up to 120° C.

After the methanol started distilling off, the fluid temperature was elevated little by little up to 200° C., and the polymerization was continued under normal pressure. Finally, there was obtained 260 ml of a distillate.

Thereafter, the fluid temperature in the flask was elevated to 200° C., and the polymerization was executed under a reduced pressure of 0.1 kPa to 0.8 kPa. The formed polymer was taken out and was granulated by using the crusher followed by a heat treatment in vacuum at 120° C. for 2 hours so as to be crystallized.

The obtained polymer (PEOx) exhibited the following properties.
  Melting point: 180° C.
  Mw (weight average molecular weight): 70,000
    (using a polymethyl metharylate as the standard)
  Hydrolysable capability (weight-retaining ratio): 0%

<Production of the Polyoxalate Copolymer>

A polybutylene oxalate copolymer (PBOx copolymer) was synthesized through the same operation as that for synthesizing the PBOx.
  oxalic acid, 180 g (2 mols),
  1,4-butanediol, 216 g (2.4 mols),
  glycerin, 0.442 g (0.0048 mols),
  Mw (weight average molecular weight): 90,000
    (using a polystyrene as the standard)
  Hydrolysable capability (weight-retaining ratio): 3%

Experimental Example 1

Preparation of Polylactic Acid (PLA) Particles

There was provided a commercially available PLA (Revode 101) having a weight average molecular weight (Mw) of 200,000.

The PLA possessed a weight-retaining ratio of 90%.

There was prepared a dichloromethane solution containing the above PLA (Revode 101) (at a concentration of 10% by weight) to use it as the fluid A. Further, an aqueous solution containing 1.5% of sodium alginate was used as the fluid B.

As the apparatus for producing the particles by the drop system, there was provided an encapsulating apparatus with a concentric nozzle of a structure shown in FIG. 4 (Encapsulator B-390, diameter at the end of the core nozzle: 450 µm, diameter at the end of the shell nozzle: 900 µm, manufactured by Nihon-Buchi Co.)

The fluid A (containing 10% of PLA) was introduced into a core flow passage (1) and the fluid B (aqueous solution containing 1.5% of sodium alginate) was introduced into a shell flow passage (3). The solutions were allowed to drop into a receiving vessel (9) filled with an aqueous solution containing 10% of calcium chloride to prepare PLA capsules (10) coated with the sodium alginate.

The PLA capsules (10) coated with the sodium alginate obtained above were once dipped in water to remove the solvent (dichloromethane) from the capsules, dipped, thereafter, in an aqueous solution of 55 mM of sodium citrate for a whole day, were, thereafter, passed through a sieve of a perforation size of 500 µm and collected, and were washed with water to thereby obtain PLA particles.

The particles possessed a circularity of 0.95. FIG. 1 is a SEM photograph of the particles.

Experimental Example 2

Preparation of Polybutylene Oxalate (PBOx) Particles

There was prepared a dichloromethane solution containing the PBOx obtained above (at a concentration of 15% by weight) to use it as the fluid A. Further, the aqueous solution containing 1.5% of sodium alginate was used as the fluid B.

As the apparatus for producing the particles by the drop system, there was provided the encapsulating apparatus with a concentric nozzle of the structure shown in FIG. 4 (Encapsulator B-390, diameter at the end of the core nozzle: 450 µm, diameter at the end of the shell nozzle: 900 µm, manufactured by Nihon-Buchi Co.)

The fluid A (containing 15% of PBOx) was introduced into the core flow passage (1) and the fluid B (aqueous solution containing 1.5% of sodium alginate) was introduced into the shell flow passage (3). The solutions were allowed to drop into the receiving vessel (9) filled with an aqueous solution containing 10% of calcium chloride to prepare PLA capsules (10) coated with the sodium alginate.

The PBOx capsules (10) coated with the sodium alginate obtained above were once dipped in water to remove the solvent (dichloromethane) from the capsules, dipped, thereafter, in an aqueous solution of 55 mM of sodium citrate for a whole day, were, thereafter, passed through a sieve of a perforation size of 150 μm and collected, and were washed with water to thereby obtain PBOx particles.

The particles possessed a circularity of 0.95. FIG. 2 is a SEM photograph of the particles.

Experimental Example 3

Preparation of Polyoxalate Copolymer Particles

Polyoxalate copolymer particles were obtained in the same manner as in Experimental Example 2 but using the polyoxalate copolymer obtained above.

The particles possessed a circularity of 0.90.

Experimental Example 4

Preparation of Particles of a Hydrolysable Resin Having an Island-Sea Structure

There were provided the PEOx produced above and the commercially available polylactic acid (PLA) used in Experimental Example 1.

0.95 g of the polyoactic acid, 0.05 g of the PEOx and 15 ml of the HFIP solvent were put into a 20 ml vial, and were dissolved. After dissolved, the mixture thereof was cast into a laboratory dish made of Teflon (registered trademark) to prepare a film.

The obtained film was dipped in water maintained at 37° C. for 2 days to hydrolyze the PEOx on the surface. The film was observed by using the SEM to be as shown in FIG. 5 (FIG. 1).

Figure 5:
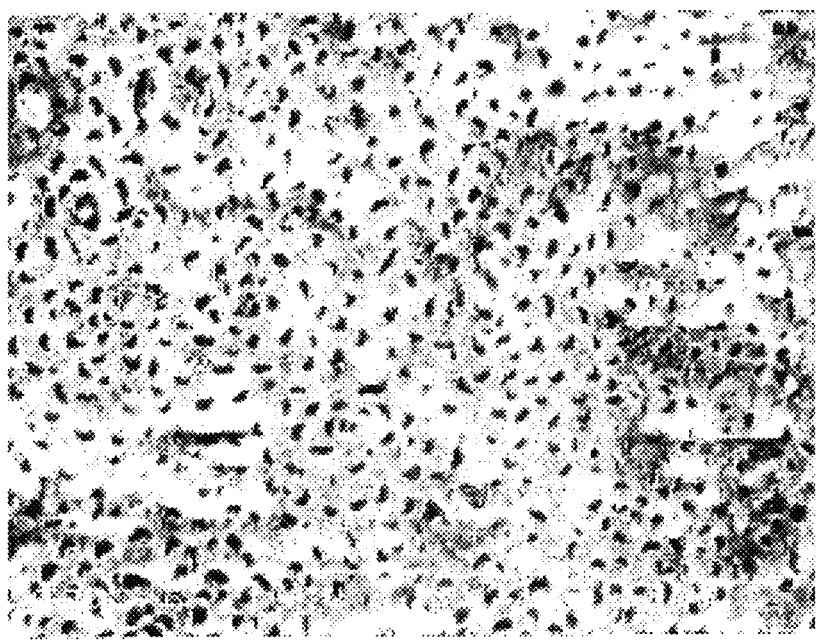
FIG. 5 An electron microphotograph (magnification of 1700 times) of a film formed by using a hydrolysable resin having an island-sea dispersion structure of a matrix resin and an easily hydrolysable polymer.

Black dots in FIG. 5 are voids from where the PEOx has escaped, and it is confirmed that the PEOx particles of an average particle size of 2 μm have been distributed in the matrix resin of the polylactic acid.

By using the above polylactic acid and the PEOx, there were prepared the particles in the same manner as in Experimental Example 3.

The particles possessed a circularity of 0.90.

Experimental Example 5

Preparation of Particles of a Hydrolysable Resin Having an Island-Sea Structure

There were prepared the particles in quite the same manner as in Experimental Example 4 but using the polyoxalate copolymer prepared above and the polylactic acid.

The particles possessed a circularity of 0.90.

DESCRIPTION OF REFERENCE NUMERALS

1: core tube
3: outer tube
5: multiple-tube nozzle for dropping
7: fluid droplets
9: receiving vessel

The invention claimed is:

1. Hydrolysable particles of a spherical shape, having an average particle size ($D_{50}$) in a range of 300 to 1,000 μm and a circularity of a short diameter/long diameter ratio of not less than 0.9,
   wherein the hydrolysable particles have a dispersion structure comprising a hydrolysable matrix resin of a weight average molecular weight (Mw) of not less than 10,000, and easily hydrolysable polymer particles more easily hydrolysable than the matrix resin that are dispersed in the matrix resin and are covered with the matrix resin,
   the hydrolysable matrix resin is a polylactic acid,
   the easily hydrolysable polymer particles comprise a polyoxalate copolymer that has branched copolymer units in an amount of 0.01 to 1.0 mol % of the main ester units, the branched copolymer units stemming from a trifunctional or more highly functional alcohol or acid, and the polyoxalate copolymer contains not less than 1 mass % and not more than 70 mass % of components insoluble in the solvent (gel percentage) as measured with 23° C. dichloromethane,
   the easily hydrolysable polymer particles have an average molecular weight (Mw) of not less than 5,000,
   the easily hydrolysable polymer particles have an average particle size of 0.01 to 5 μm, and are used in an amount of 5 to 95 parts by mass per 100 parts by mass of the polylactic acid, and
   if hydrolysable capabilities are represented by weight-retaining ratios after being dipped in water of 70° C. for 168 hours, the hydrolysable particles exhibit a weight-retaining ratio of not more than 50% and the matrix resin and contained in the hydrolysable particles exhibits a weight-retaining ratio of not less than 90%.

2. A method of extracting underground resources including a step of mixing the hydrolysable particles according to claim 1 and a proppant to an aqueous dispersion fluid, and introducing the fluid with pressure into an ore chute formed under the ground.

* * * * *